July 21, 1970 P. K. WEIMER 3,521,244

ELECTRICAL CIRCUIT FOR PROCESSING PERIODIC SIGNAL PULSES

Filed Oct. 23, 1968 7 Sheets-Sheet 1

INVENTOR

PAUL K. WEIMER

BY Robert P. Williams

ATTORNEY

INVENTOR
PAUL K. WEIMER
BY Robert P. Williams
ATTORNEY

July 21, 1970 P. K. WEIMER 3,521,244

ELECTRICAL CIRCUIT FOR PROCESSING PERIODIC SIGNAL PULSES

Filed Oct. 23, 1968 7 Sheets-Sheet 3

INVENTOR
PAUL K. WEIMER

BY [signature]
ATTORNEY

July 21, 1970 P. K. WEIMER 3,521,244

ELECTRICAL CIRCUIT FOR PROCESSING PERIODIC SIGNAL PULSES

Filed Oct. 23, 1968 7 Sheets-Sheet 4

INVENTOR

PAUL K. WEIMER

BY

ATTORNEY

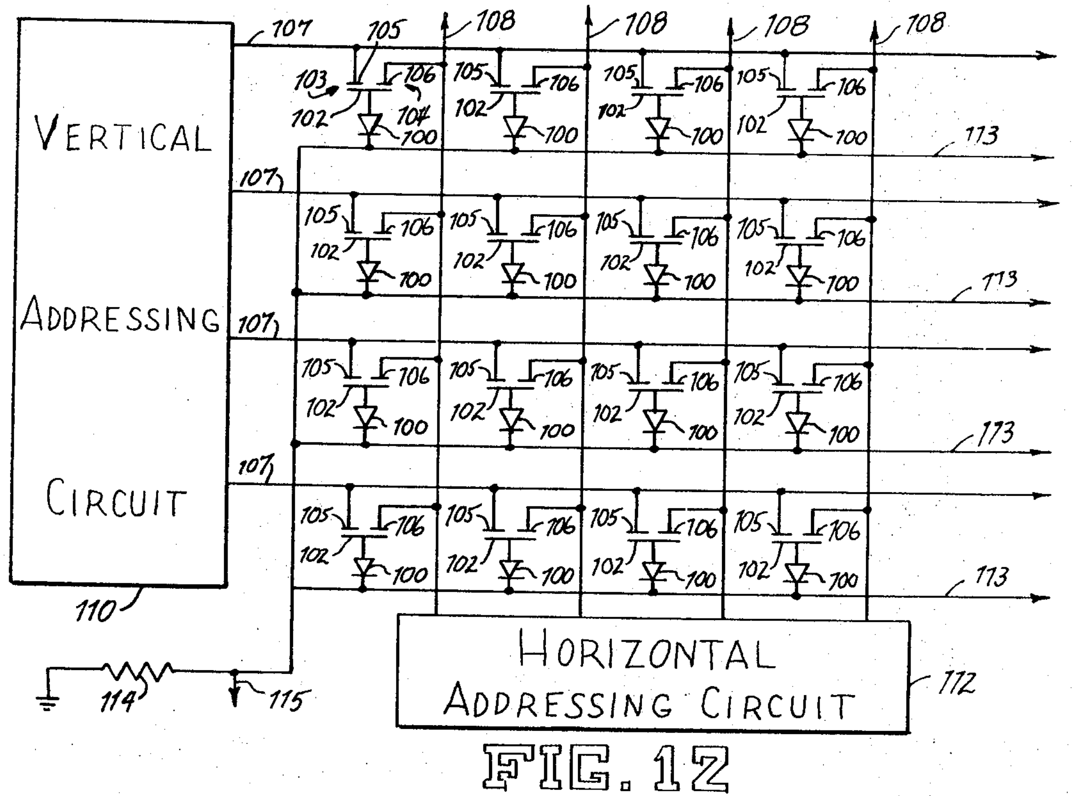
FIG. 12
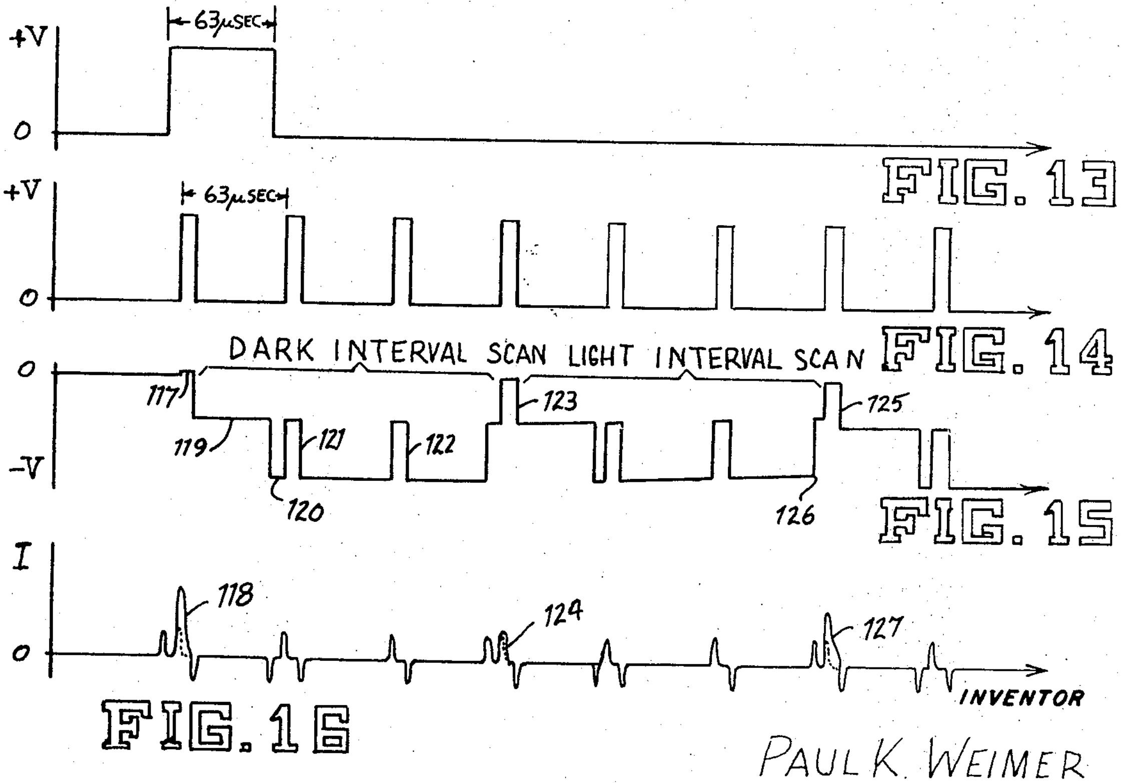
FIG. 13, FIG. 14, FIG. 15
FIG. 16
INVENTOR
PAUL K. WEIMER
BY Robert P. Williams
ATTORNEY July 21, 1970 P. K. WEIMER 3,521,244

ELECTRICAL CIRCUIT FOR PROCESSING PERIODIC SIGNAL PULSES

Filed Oct. 23, 1968 7 Sheets-Sheet 6

INVENTOR

PAUL K. WEIMER

BY Robert P. Williams

ATTORNEY

July 21, 1970 P. K. WEIMER 3,521,244

ELECTRICAL CIRCUIT FOR PROCESSING PERIODIC SIGNAL PULSES

Filed Oct. 23, 1968 7 Sheets-Sheet 7

INVENTOR

PAUL K. WEIMER

BY Robert P. Williams

ATTORNEY

United States Patent Office 3,521,244

Patented July 21, 1970

3,521,244
ELECTRICAL CIRCUIT FOR PROCESSING PERIODIC SIGNAL PULSES

Paul K. Weimer, Princeton, N.J., assignor to RCA Corporation, a corporation of Delaware Filed Oct. 23, 1968, Ser. No. 769,850
Int. Cl. G11c *11/36, 11/42*
U.S. Cl. 340—173 26 Claims

ABSTRACT OF THE DISCLOSURE

This solid state electro-optical sensor array includes a set of photodiodes, each of which alternately integrates the light flux at an element of the array and acts as a switch when the element is sampled to provide an electrical output representative of the integrated light. Capacitance means serially coupled to each diode provides charge storage. The array may be randomly sampled for digital memory applications, or it may be scanned in an ordered manner for image translation.

BACKGROUND OF THE INVENTION

The present invention was made in the course of or under a contract or subcontract thereunder with the Department of the Air Force. The invention relates to electro-optical translating arrays and, in particular, to electro-optical sensor circuits and devices adapted to provide an electrical signal representative of an optical input. Some known electro-optical sensor circuits are particularly adapted for use in optical-digital computer applications to translate patterns of light representative of binary information into electrical signals. These circuits include an array of photodetectors, each of which is responsive to light to provide an electrical signal. Typically, there is no provision in these circuits for charge storage. For efficient operation, therefore, the photodetectors must be relatively sensitive to light or, in the alternative, the light used to illuminate them must be of high intensity. Sometimes, laser light is used in order to achieve sufficient intensity. The use of lasers or sensors of extremely high sensitivity is expensive, however.

Known solid state image sensor circuits and devices for television applications also include an array of photodetectors. Each element of a typical array consists of a photosensitive device in series with a switching device for isolating the photosensitive device from the output of the sensor at all times except during the moment that it is scanned. The photosensitive element may be, for example, a photosensitive resistor, a photodiode or a phototransistor. Where a photoresistor or a photodiode is employed, the switching device may be a diode or a transistor. A phototransistor, however, contains an internal switch in its emitter diode and will operate in arrays without an additional switching device at each element. Known image sensor arrays have been constructed as vapor-deposited thin film arrays and as diffused monolithic structures.

Prior image sensor arrays of the monolithic integrated type have employed a photodiode which is operated in the so-called "charge storage" mode, a mode of operation similar to that employed in an electron beam scanned vidicon. Charge storage operation is based on the principle that a reverse biased PN junction will lose charge stored on the junction capacitance at a rate which is a function of the intensity of the light falling on the junction. Photon generated current flow through a reverse biased junction is directly proportional to the integrated sum of the illumination taken over a scanning interval. Thus, by measuring the current which flows during each scanning pulse to recharge the junction capacitance to a predetermined level, it is possible to obtain a signal which is proportional to the integrated illumination. The principal advantage of this mode of operation is that it permits the use of relatively insensitive photodetectors.

Prior solid state image sensing devices adapted to operate in the charge storage mode have been operated successfully but have suffered from certain disadvantages. Those which have been fabricated as thin film arrays have suffered from instability and low sensitivity. Those which have been fabricated as monolithic integrated arrays have been relatively complex and are difficult to make with enough elements in a sufficiently small area as to provide resolution comparable to that of present television.

SUMMARY OF THE INVENTION

The present solid state image sensing array employs only one active element, i.e., a photodiode, at each element of the array, which photodiode acts alternately as a photosensor and as a switch. This dual functioning of the photodiodes is made possible by the inclusion of a relatively large, voltage-independent capacitance in series with each photodiode. The circuit operates in a charge storage mode in which the stored charge is held by the series capacitance, and the constant value of this capacitance simplifies the operation of the circuit.

In the present image sensor panel structures, the sensing diodes are formed as a monolithic array of PN junctions of the planar type formed on one surface of a body of semiconductive material and the capacitance means serially coupled thereto are thin film structures on the surface of the body. The structures are relatively simple to construct and may include a relatively high density of elements.

THE DRAWINGS

FIG. 12 is a schematic representation of another embodiment of the present novel circuit;

FIGS. 13 to 16 are diagrams illustrating a mode of operation of an element of the circuit of FIG. 12;

THE PREFERRED EMBODIMENT

Figure 1:
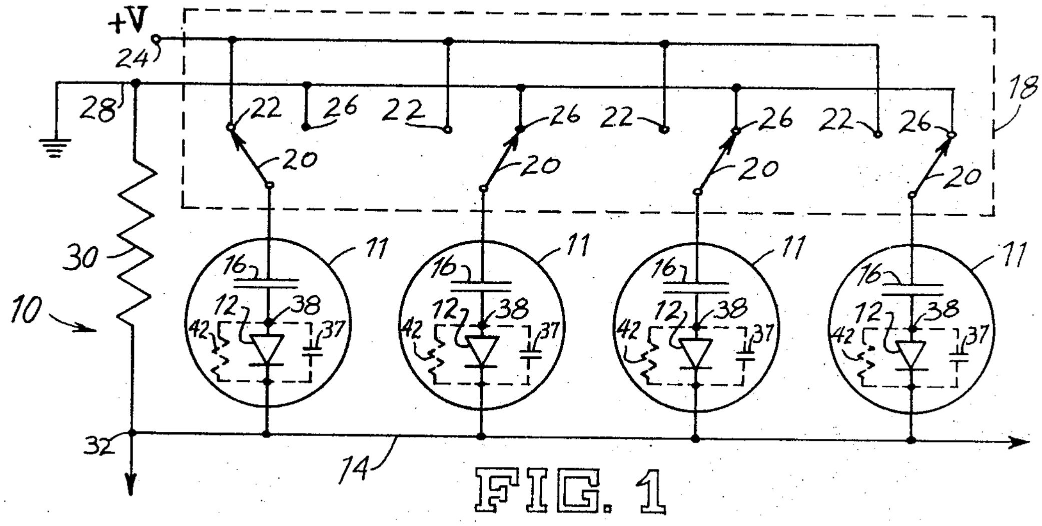
FIG. 1 is a schematic representation of one embodiment of the present novel circuit.

One embodiment of the present novel circuit is indicated generally at 10 in FIG. 1. The circuit 10 includes a linear array of storage elements 11 each of which includes a photodiode 12 connected in series with a capacitor 16. The structure chosen for the capacitor 16 should have the property that the capacitance value thereof is independent of voltage, i.e., it should not be a voltage variable capacitance like that of a PN junction.

The cathodes of the respective photodiodes 12 are connected to a lead 14 and the anodes are each connected to a plate of one of the capacitors 16. The other plate of each of the capacitors 16 is connected to a selection circuit 18 which is illustrated in simplified form as consisting of a set of double pole switches 20. One terminal, 22, of each switch 20 is connected to a source of positive potential represented by a terminal 24. The other terminal, 26, of each switch 20 is connected to ground by means of a lead 28.

A load resistor 30 is connected between the leads 14 and 28. The output of the circuit is taken across the load resistor 30 between ground and a point 32 at the termination of the lead 14.

Figure 2:
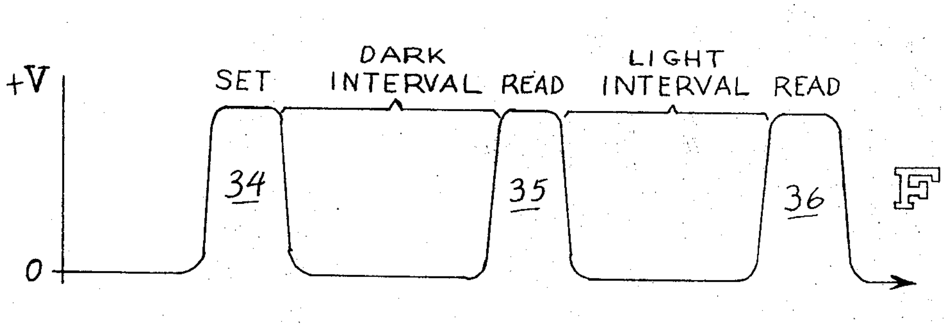
FIGS. 2 to 4 are a series of diagrams illustrating the operation of an element of the circuit of FIG. 1.

In the operation of the circuit 10, each storage element 11 is scanned by connecting it momentarily, by means of its associated switch 20, to the +V terminal 24. This may be regarded as applying a square wave pulse to the selected storage element. The pulses are not ideal square waves and require some transient time to turn "on" and "off." Three such pulses, 34, 35, and 36, are shown in FIG. 2. The following description applies to each of the four storage elements 11 in the circuit 10.

The pulse 34, labeled "set", is first applied to a selected storage element 11 causing its diode 12 to be forward biased. Current will flow from the +V terminal through the selected switch 20 and the storage element 11, and then through the load resistor 30 to ground, with the result that the capacitor 16 and the internal capacitance of the diode 12, represented in dashed lines at 37 in FIG. 1, will be charged. The turn-on voltage of the diode is preferably low so that the potential on the point 38 never rises much above that on the lead 14.

Figure 3:
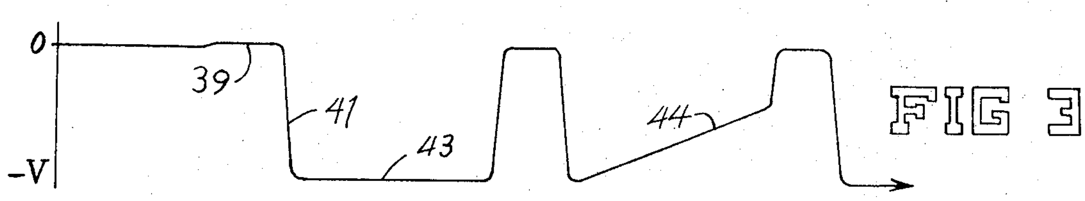
Figure 4:
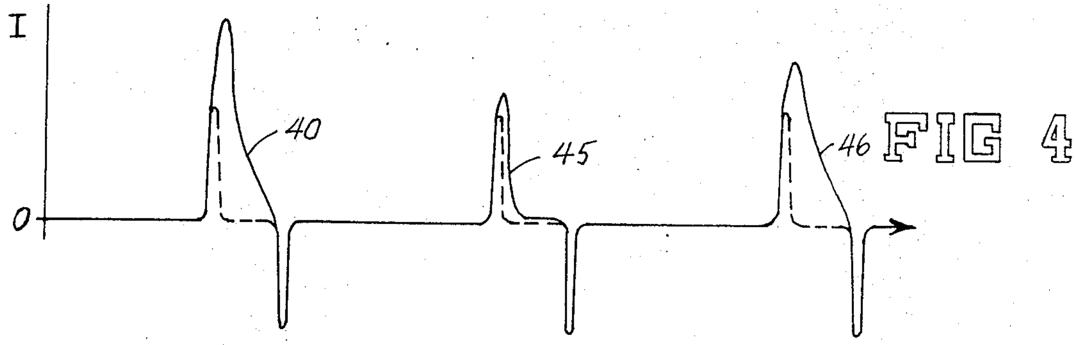

FIG. 3 is an exaggerated plot of the potential on the point 38 against time, with the time scale matching that of FIG. 2, and FIG. 4 is a plot of the current flowing through the load, on the same scale. The slight rise in potential on the point 38 produced by the set pulse is indicated by the portion 39 of the curve in FIG. 3. Current flows through the load resistor 30 and the diode 12 to charge the capacitor 16 to about +V volts. This current is represented in FIG. 4 by a sharp pulse 40 of relatively large magnitude, which is the sum of the current required to charge the capacitor 16 and a transient current, shown in dashed lines, which flows through the load at the beginning and end of each setting or scanning pulse as a result of the direct capacitive coupling which exists from the selection circuit 18 to the lead 14.

Removal of the set pulse by returning the switch to its ground terminal 26 causes the diode 12 to be reverse biased, and drives the point 38 to about −V volts as suggested by the portion 41 of the curve of FIG. 3. The exact value of the negative potential to which the point 38 is driven depends upon the relative values of the capacitor 16 and the internal capacitance 37 of the diode. Preferably, the capacitance of the capacitors 16 is selected to be very much greater than the internal capacitance of the diodes so that the negative potential of point 38, reached at removal of the set pulse, approaches very closely to −V. The internal capacitance of the photodiodes should be kept as small as possible in order to minimize the direct capacitive feedthrough of the switching pulse into the output lead 14.

The back resistance of each diode 12 is represented in dashed lines at 42 in FIG. 1. In the dark, this resistance is very high and consequently the charge on the capacitor 16 of a selected storage element 11 will be preserved. A condition of darkness is assumed in the interval between the pulses 34 and 35 in FIG. 2. During this interval, the potential on the point 38 remains relatively constant at about −V, as shown by the portion 43 of the curve in FIG. 3.

If the diode 12 of the selected element 11 is illuminated, its internal resistance 42 is much lower because of the generation of photocarriers in response to the light energy falling on the diode, and the lowered resistance allows the charge on the capacitor 16 to leak off. A condition of illumination is assumed in the interval between the pulses 35 and 36 in FIG. 2. Here, the potential on the point 38 becomes less negative with time, as suggested by the sloping portion 44 of the curve in FIG. 3.

When it is desired to determine how much light has reached a given diode 12, the switch 20 associated therewith is connected to its terminal 22, thus applying +V volts across the selected storage element 11, which results in current flow through the circuit between the terminal 24 and ground. In the dark condition, because little charge has been able to leak off from the capacitor 16, only a small amount of current will be required to recharge the capacitor 16. As shown by the pulse 45 in FIG. 4, the current which flows during the scanning pulse 35 is composed almost entirely of the capacitive feedthrough signal. On the other hand, after an interval of illumination, a greater amount of current is required to recharge the capacitor 16, as indicated by the pulse 46 in FIG. 4. Because of the fixed value of the capacitor 16, the output waveforms are less complex than would be the case if the capacitance were voltage dependent.

The capacitive feedthrough signals are not useful and can be removed electrically by various methods well known in the art of scanning of solid state arrays. For example, the unwanted capacitive signals may be subtracted from the total output signal by means of bucking signals in opposite phase relation to the capacitive signals.

Figure 5:
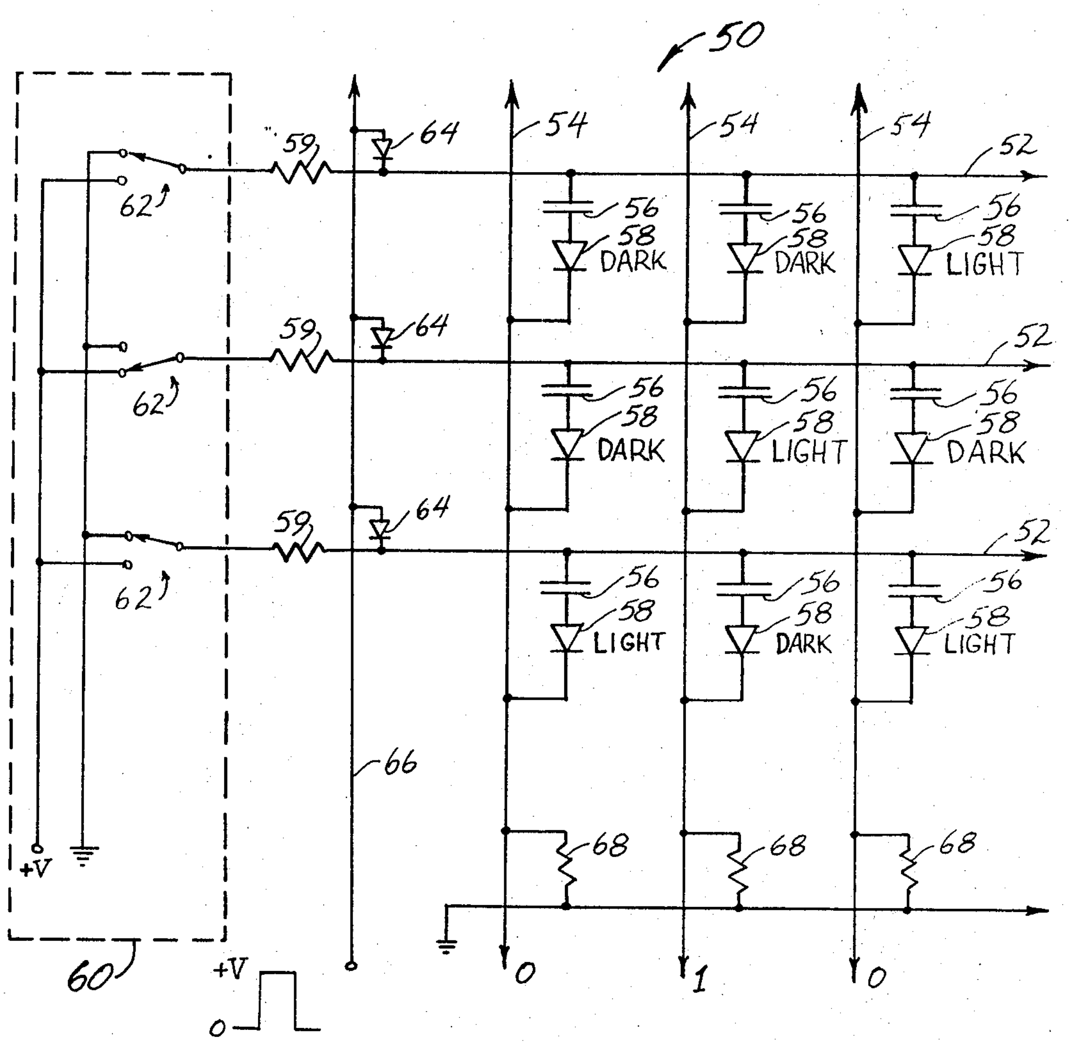
FIG. 5 is a schematic circuit diagram illustrating a two-dimensional array of circuit elements of the type shown in FIG. 1 and adapted for use in a digital system.

FIG. 5 illustrates one way in which the capacitor diode storage elements 11 of the circuit 10 may be employed in a two dimensional array, to translate optical digital information into electrical signals, and to store the information. The circuit, designated by the numeral 50 in FIG. 5, includes a plurality of row conductors 52 and a plurality of column conductors 54. At each intersection between the row conductors 52 and the column conductors 54, there is a series combination of a capacitor 56 and a diode 58, which elements are similar to the capacitor 16 and diode 12 of the circuit 10. Each capacitor-diode combination may represent a "bit" of information and each row thereof may represent a "word."

The row conductors 52 are each connected through a large resistance 59 to a row selection circuit 60 like the selection circuit 18 of FIG. 1. The circuit 60 contains a plurality of switch means 62 for connecting the row conductors 52 selectively to either a positive voltage, +V, or ground. In addition, the row conductors 52 are each connected through a diode 64 to a source of potential via a lead 66. The diodes 64 have their cathodes connected to the row conductors 52 and their anodes connected to the lead 66, as shown.

The column conductors 54 function as the output leads for the circuit 50. Each column conductor 54 is connected to ground through a resistor 68, and the output of the device is taken across these resistors.

In the operation of the circuit 50, the capacitors 56 are first set to a uniform condition of charge. This is accomplished by applying a "set" pulse in the form of a positive voltage to the lead 66, which causes current to flow from the lead 66 through the diodes 64 and the row conductors 52 to and through each capacitor 56 and diode 58 to the column conductors 54, and then to ground through the resistors 68. The resistors 59 serve only to isolate the lead 66 from the row selection circuit 60 to avoid shorting the lead 66 to ground in the event that some of the row selector switches 62 are grounded during the application of the set pulse.

A light pattern representing digital information is then transmitted to the array of diodes 58. This may be done, for example, by exposing the diodes 58 to light through a mask (not shown) such as a punched card or tape. A typical light pattern is represented in FIG. 5 by the words "dark" and "light" adjacent to the diodes 58. A dark condition may be taken to represent a logical "0" and a light condition may be taken to represent a logical "1."

At a predetermined time after exposure, a "word" to be read may be selected by employing a switch 62 in the row selection circuit 60 to apply a positive voltage to the selected row conductor 52. In the present example, the second or central switch 62 is shown in this condition. Upon closing the switch 62 to the positive voltage, current will flow to restore the charge which has leaked off the capacitor 56 in the interval since the termination of the "set" pulse. This current will produce a voltage drop in the resistors 68 which may be read as the output signal. For those diodes 58 which have not been illuminated (those marked "dark" in FIG. 5), little charge will have leaked off and little current will flow. Thus, in this example, the first and third diodes 58 in the central row will produce outputs representing "0." The illuminated diodes 58 will have been discharged to a much greater extent and thus will require a greater current flow to recharge them. This greater current flow will result in a higher voltage drop across the associated resistor 68. The output from the central diode 58 (marked "light") will thus represent a "1." The circuit 50 has memory capability if it is maintained in the dark after exposure, since this will preserve the information stored as charge on the capacitors 56 for a relatively long time.

The circuit 50 has been described as operated in a "word" organized mode with multiple outputs from the columns. The sensing elements of the circuit 50 may also be addressed sequentially for television-type image translation. A suitable scanning system of this kind is known and is described, for example, in Weimer et al., "A Self-Scanned Solid State Image Sensor," 55 Proc. IEEE 1591, at 1593 (September 1967).

Figure 6:
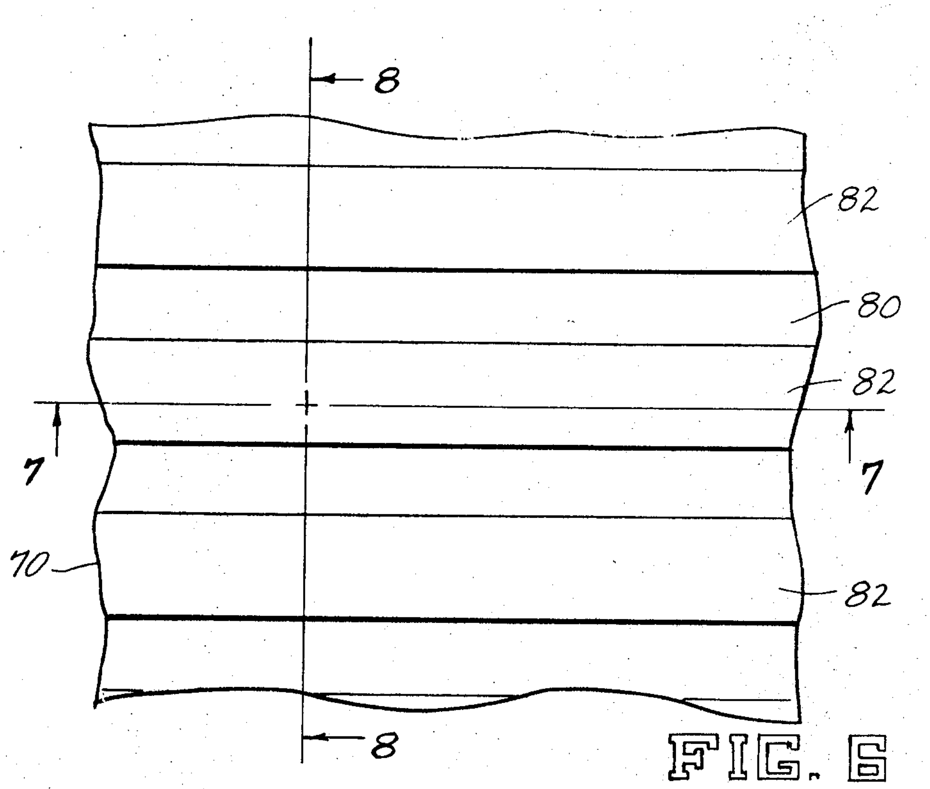
FIG. 6 is a plan view of a monolithic integrated structure exemplifying one way of building the circuit of FIG. 5.
Figure 7:
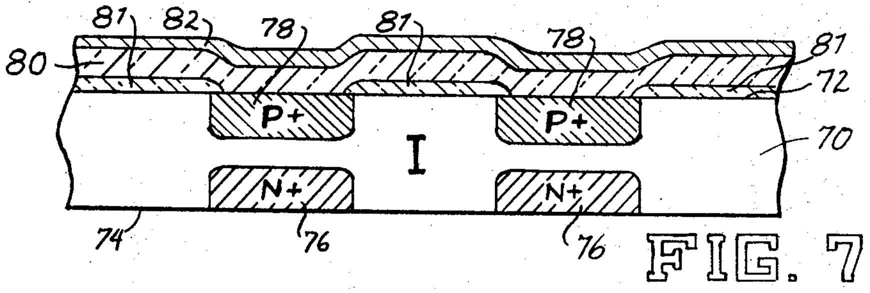
FIG. 7 is a cross sectional view taken on the line 7—7 of FIG. 6.
Figure 8:
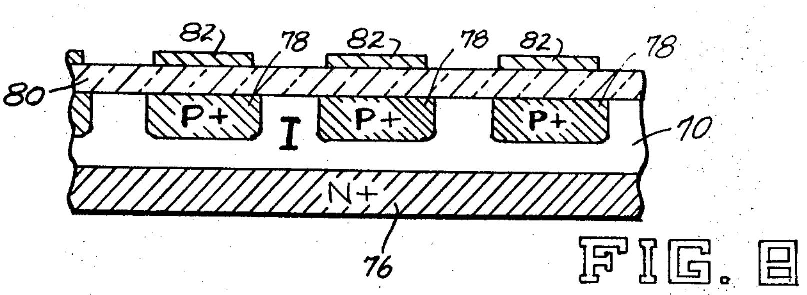
FIG. 8 is a cross section taken on the line 8—8 of FIG. 6.

FIGS. 6 to 8 illustrate one way in which the circuit 50 may be fabricated in integrated form. As shown, there is a substrate 70 of intrinsic semiconductive material, such as silicon, which has an upper surface 72 and a lower surface 74 thereon. Adjacent to the lower surface 74 are a plurality of elongated parallel diffused regions 76 which, in this example, are of N+ type conductivity' These regions 76 perform the function of the column conductors 54.

Adjacent to the upper surface 72 of the substrate 70 are a plurality of generally square P+ diffused regions 78. Each P+ region 78 constitutes an anode and, together with the intrinsic material of the substrate 70 and the N+ material of the regions 76, provides a PIN photodiode.

A layer of insulating material 80 overlies the surface 72 of the substrate 70. The insulation is made thicker in the areas adjacent to the exposed intrinsic material of the body 70, by, for example, including extra layers 81 of insulating material in these regions. Upon the insulating layer 80 are a plurality of elongated parallel conductive strips 82 which perform the function of the row conductors 52. These conductive strips 82 are capacitively coupled through the insulating layer 80 to the P+ regions 78, thereby introducing the functions of the capacitors 56.

Figure 9:
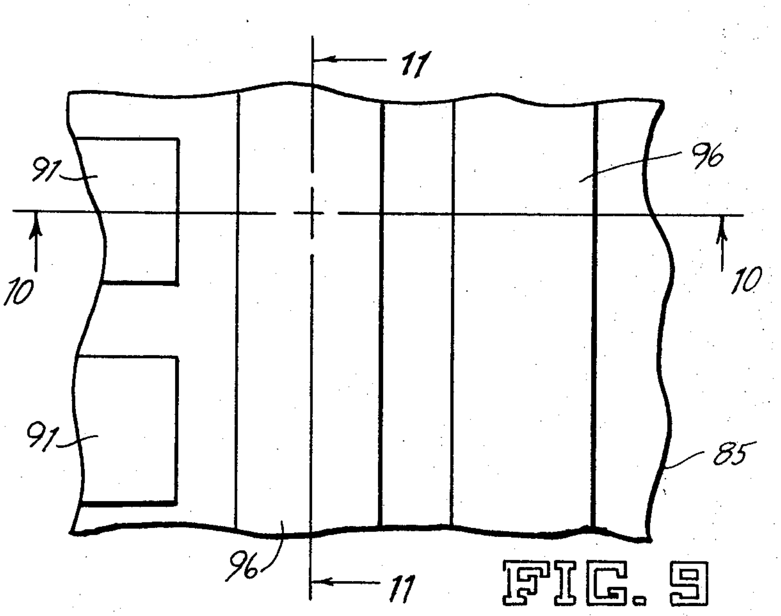
FIG. 9 is a plan view of a monolithic integrated structure illustrating another way of building the circuit of FIG. 5.
Figure 10:
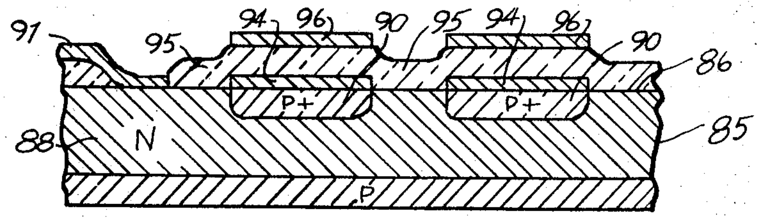
FIG. 10 is a cross section taken on the line 10—10 of FIG. 9.
Figure 11:
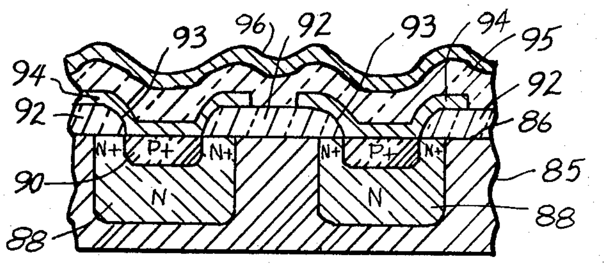
FIG. 11 is a cross section taken on the line 11—11 of FIG. 9.
Figure 17:
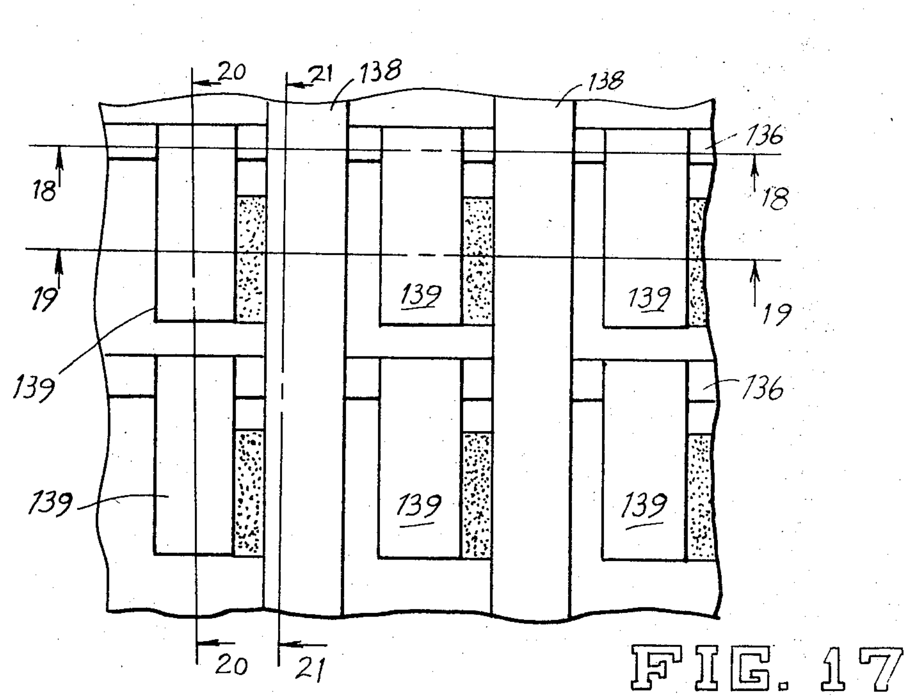
FIG. 17 is a plan view of a monolithic integrated structure embodying the circuit of FIG. 12.
Figure 18:
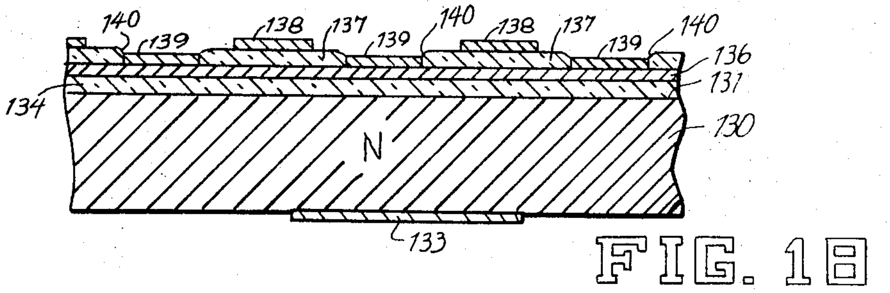
FIG. 18 is a cross section taken on the line 18—18 of FIG. 17.
Figure 19:
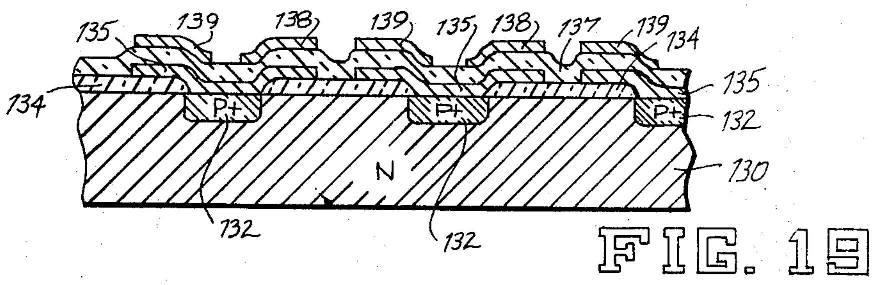
FIG. 19 is a cross section taken on the line 19—19 of FIG. 17.

Another structure in which the circuit 50 may be embodied is illustrated in FIGS. 9 to 11. This structure includes a substrate 85 which is initially of P type conductivity throughout. The substrate 85 has an upper surface 86 adjacent to which are a plurality of elongated parallel regions 88 which are of graded conductivity. As shown in FIG. 11, the regions 88 are of N+ type conductivity near the surface 86 and are of N type conductivity remote from the surface 86. Within each region 88 are a plurality of spaced P+ type regions 90. The P+ type regions 90, the N type portions of the regions 88, and the junctions therebetween constitute the photosensitive diodes of the array. The N+ portions of the regions 88 constitute row conductors. Electrodes 91 are in ohmic contact with the regions 88 at one end thereof (FIGS. 9 and 10) and serve to connect the regions 88 to external circuitry.

Disposed on the upper surface 86 of the substrate 85 is a layer 92 of insulating material. Openings indicated at 93 are provided in the layer 92 at positions adjacent to each of the P+ type regions 90. A contact electrode 94 of relatively limited extent is in contact with each P+ type region and extends upwardly out of the opening 93 onto the top surface of the insulating layer 92.

The contact electrodes 94 and the portions of the insulating layer 92 which are not covered thereby are overcoated with a layer of insulating material 95. A plurality of column conductors 96 in the form of deposited metal layers extend transversely to the regions 88 in overlying relation to the electrodes 94. The electrodes 94 and the column conductors 96, together with the insulating material of the layer 95 between them, constitute capacitors. These capacitors are connected in series with the diodes formed by the regions 90 and 88 by the contacts between the electrodes 94 and the P+ type regions 90.

FIG. 12 illustrates another form of the present electro-optical image translator. In the circuit of FIG. 12, there are a plurality of photo-diodes 100 which are similar to the photo-diodes 12 of FIG. 1. The anode of each photodiode 100 is connected to a common plate 102 of a pair of capacitor elements 103 and 104, respectively. The capacitors 103 each have an opposed plate 105 and the capacitors 104 each have an opposed plate 106. The plates 105 of the capacitors 103 are connected to a plurality of horizontal row conductors 107 and the plates 106 of the capacitors 104 are connected to a plurality of vertical column conductors 108. Each of the row conductors 107 is connected to a vertical addressing circuit 110 and each of the column conductors 108 is connected to a horizontal addressing circuit 112. The cathodes of all of the diodes in a given row are connected to a conductive means 113 which means are all then connected through a load resistor 114 to ground. The output of the device may be taken across the load resistor 114 between ground and an output lead 115.

In the operation of the circuit of FIG. 12, as a television-type image translator, the photo-diodes 100 are scanned by the circuits 110 and 112 in sequential fashion so as to provide a regular output signal across the load resistor 114. The instant of scan for each element of the array occurs when both of its conductors 107 and 108 are in the positive voltage condition, because there is then sufficient positive voltage to drive the associated diode 100 into forward bias. The sequence of scanning of the array in FIG. 12 may be, for example, across each row from left to right and from row to row from top to bottom.

Each time a photo-diode 100 is forward biased, its associated capacitors 103 and 104 become charged. Charge leaks off the capacitors in proportion to the amount of light which falls on the diode 100 in the period between scans. Thus, for each coincidence of scanning pulses at a given circuit element, current will flow from the scanning circuits through the circuit element and the load resistor to ground and the magnitude of this current is a function of the amount of light which has discharged the capacitors.

FIGS. 13 and 14 illustrate the durations and relationships of the pulses which are applied for scanning purposes in the circuit of FIG. 12. FIG. 13, for example, illustrates a typical pulse produced by the vertical addressing circuit 110 and applied to one of the row conductors 107. This pulse is relatively long in duration and is at least as long as the time required for the other addressing circuit 112 to complete one cycle of its operation. Its magnitude is some value less than the value of voltage required to drive a diode 100 into forward conduction. FIG. 14 shows a series of relatively short pulses which represent the pulses applied to a column conductor 108 by the horizontal addressing circuit 112. The pulses in FIG. 14 are spaced by a time greater than the time duration of the pulse in FIG. 13, and their magnitudes are of a value which in combination with the pulse in FIG. 13 is sufficient to drive a diode 100 into forward conduction. As shown by the legends in FIGS. 13 and 14, the pulse in FIG. 13 may be 63 μsec. long and the pulses in FIG. 14 may be spaced at intervals of 63 μsec. Overlap between the pulses must occur only once during each scanning period.

FIG. 15 is a plot of the potential appearing at the plate 102 of one of the elements of the circuit of FIG. 12. As illustrated, before any voltages are applied to the array, the plate 102 is at 0 volts. Upon the application of the scanning pulses on the associated row and column conductors 107 and 108, the plate 102 is raised slightly above ground potential as indicated by the portion 117 of the curve in FIG. 15. Current flows through the load resistor 114 due to the condition of forward bias on the diode 100, to charge the capacitors 103 and 104 associated therewith. This current is represented in FIG. 16 by the pulse 118. Some of the current will be the result of capacitive feedthrough, like the capacitive feedthrough pulses described above with reference to FIG. 4. The capacitive feedthrough current, represented in dashed lines in FIG. 16, may be removed electrically from the total output signal by applying bucking signals in the external circuits.

At the termination of the pulse on the column conductor 108, the potential on the plate 102 is driven to some value less than zero as indicated by the portion 119 of the curve in FIG. 15. Then, at the end of the pulse on the row conductor 107, the potential on the plate 102 is driven further negative to a value indicated by the portion 120 of the curve in FIG. 15, because the column conductor 107 and the row conductor 108 are both at ground potential. Thereafter, each repeated pulse on the column conductor 108, as represented by the pulses 121 and 122, has no effect on the element under consideration, since these pulses are not of sufficient magnitude to themselves bring the diode 100 into forward conduction.

After a complete scanning cycle, the voltages on the row conductor 107 and the column conductor 108 for the given element coincide again and this is indicated in FIG. 15 by the pulse marked "scan." In the period between the pulse 117 and the pulse 123, it is assumed that no light has fallen on the diode 100 of the circuit element. Relatively little charge is lost by the capacitors 103 and 104 under this condition. Consequently, only a small current will flow during the pulse 123, as indicated in FIG. 16 by the small pulse 124. Like the output pulse 45 in FIG. 4, this pulse 124 is largely composed of the transient capacitive feedthrough signal.

After another scanning interval, coincidence of pulses on the row and column conductors again occurs. Assuming that there has been a condition of illumination on the particular circuit element under consideration in the interval between the scanning pulses 123 and 125 in FIG. 15, the back resistance of the diode 100 will be much lower than in the dark condition and charge will have leaked from the plate 102 through the diode 100 to ground. This leakage is represented in FIG. 15 by the upward slope of the curve in the region between the scanning pulses 123 and 125. Thus, at the time of the beginning of the row pulse, the potential on the plate 102 will be at a potential, represented at 126 in FIG. 15, somewhat higher than the maximum negative potential that is achieved in the array. Consequently, the capacitors 103 and 104 will be charged at some voltage less than the maximum and current will be required to recharge them to their maximum value. The amount of current again will be proportional to the amount of light which has fallen on the circuit element in the period between scans, as represented in FIG. 16 by the pulse 127 which is shown to be of greater magnitude when the dark pulse 124.

One way in which the circuit of FIG. 12 may be fabricated in monolithic integrated form is illustrated in FIGS. 17 through 21. As shown, there is a body 130 of semiconductive material, preferably of N type silicon, which has an upper planar surface 131. Within the body 130 and adjacent to the surface 131 thereof is an array of spaced P+ diffused regions 132. These regions constitute the anodes of the various diodes 100 in the array and the N type material of the body 130 constitutes a common cathode for all of the respective diodes. A conductive electrode 133 may be provided on the body 130 for connecting the N type material to external circuitry.

On the surface 131 of the body 130 is a layer 134 of insulating material, such as silicon dioxide, for example. Openings are provided, as by etching, in the insulating layer 133, one adjacent to each of the P+ type anode regions 132, and within each of the openings 134 is a plate member 135 which is in ohmic contact with a P+ type region 132 and which extends upwardly onto the upper surface of the insulating layer 134 for a limited extent. The plate members 135 correspond to the common plate 102 of the capacitors 103 and 104 in the circuit of FIG. 12.

Figure 20:
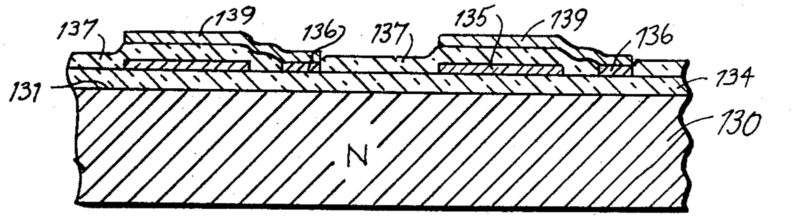
FIG. 20 is a cross section taken on the line 20—20 of FIG. 17.
Figure 21:
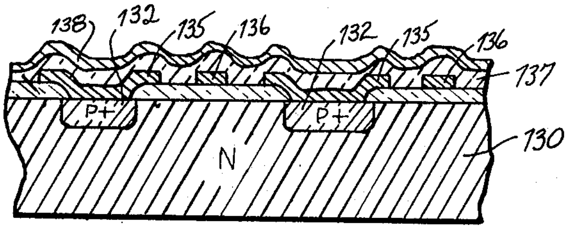
FIG. 21 is a cross section taken on the line 21—21 of FIG. 17.

A plurality of parallel row conductors 136 are disposed on the upper surface of the insulating layer 134 in the spaces between the plate members 135, as shown best in FIGS. 20 and 21. A layer 137 of insulating material, again for example silicon dioxide, overlies the elements thus far described. Finally, on the insulating material 137 are disposed a plurality of column conductors 138 and a plurality of capacitor plate members 139. The column conductors 138 are relatively broad and are positioned in such a manner that they overlie a portion of each of the lower plate members 135 and form capacitors therewith. The capacitor plate members 139 are also relatively broad and extend in a direction parallel to the column conductors from a location in contact with the row conductors 136 into overlying relation to another portion of the lower plate members 135. Suitable openings, indicated at 140, are provided in the insulating layer 137 to permit contact between the plate members 139 and the row conductors 136.

Those portions of the column conductors 138 which overlie the plate members 135 correspond to the capacitor plates 106 and the plate members 139 correspond to the plates 105 of the circuit of FIG. 12. Thus, all of the circuit functions represented in FIG. 12 are performed by the relatively simple structure of the device of FIG. 17. Only one diffusion, to form the P+ regions 132, is required. The conductors and insulators may be formed by photolithographic techniques which are well understood in the art of monolithic integrated circuits.

Figures 22, 23, 24:
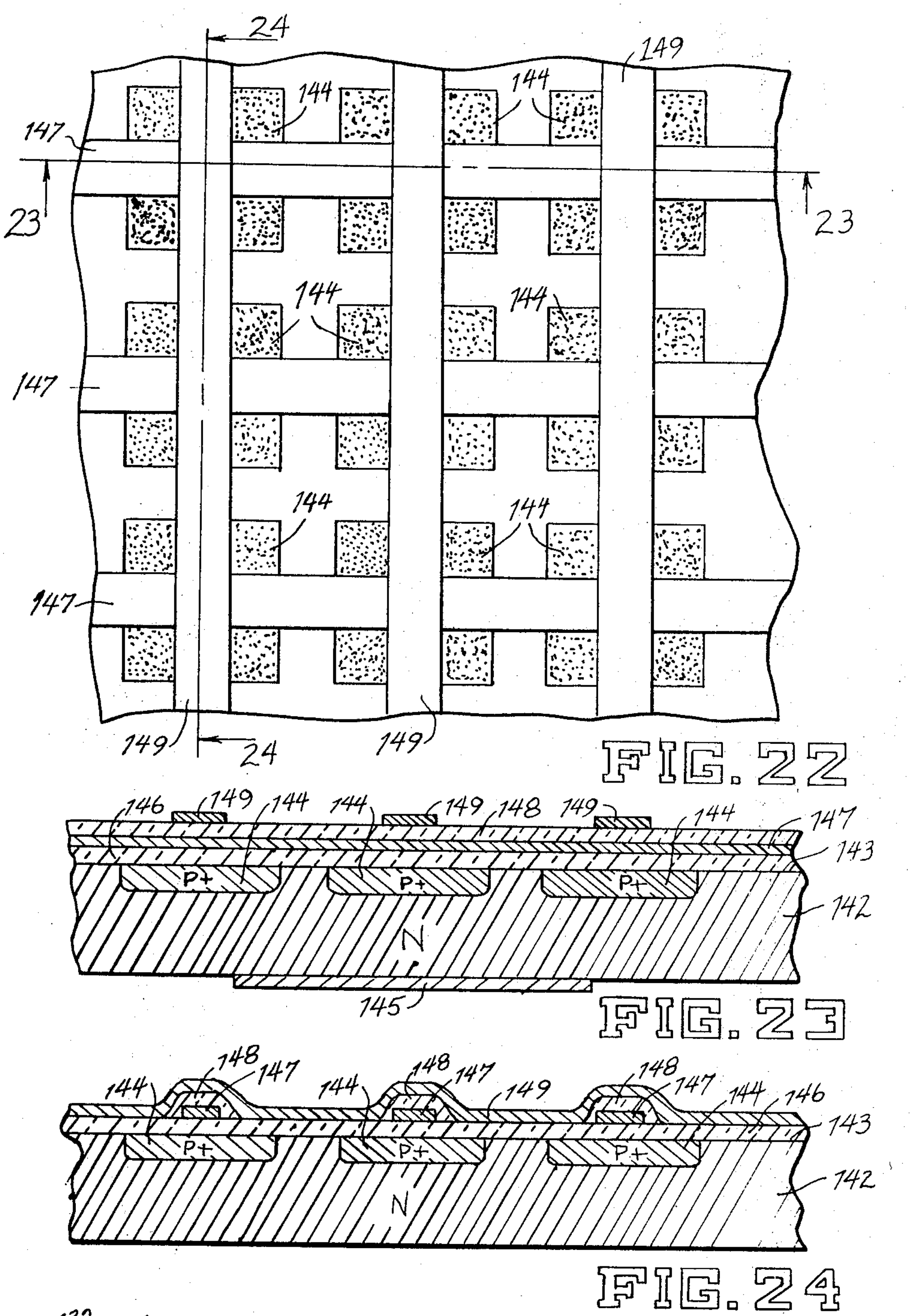
FIG. 22 is a plan view of another monolithic integrated device which embodies the circuit of FIG. 12.
FIG. 23 is a cross section taken on the line 23—23 of FIG. 22.
FIG. 24 is a cross section taken on the line 24—24 of FIG. 22.

Another even more simple construction for the circuit of FIG. 12 is illustrated in FIGS. 22 to 24. Here, there is a body 142 of semiconductive material, such as N type silicon, which has an upper surface 143. Within the body 142 adjacent to the surface 143 are a plurality of P+ type regions 144. The semiconductor structure is substantially identical with that of FIG. 17. An electrode 145 like the electrode 133 may be provided to connect the N type material to external circuitry.

Disposed over the entire surface 143 of the body 142 is a continuous layer 146 of insulating material, for example, silicon dioxide. The layer 146 has no openings therein. On the upper surface of the insulating layer 146 are a plurality of row conductors 147 and on each of the row conductors 147 is a layer of crossover insulation material 148. Finally, above the top surface of the insulating layer 146 and extending over the crossover insulators 148 are a plurality of column conductors 149 which extend in a direction transversely with respect to the row conductors 147.

In this embodiment, the P+ regions 144 are made relatively large and act themselves as capacitor plates. The function of the upper plates 105 and 106 of the capacitors 103 and 104 in the circuit of FIG. 12 are performed by those portions of the row conductors 147 and column conductors 149 which overlie the P+ type regions 144. For this purpose, the column conductors 149 should be made somewhat wider than the row conductors 147 so that the respective capacitances between the region 144 and each of the conductors will be about equal.

What is claimed is:

1. An electrical circuit for processing periodic signal pulses comprising a pair of circuit elements, each of said elements comprising:

a photodiode, capacitance means serially coupled to said photodiode, said capacitance means having a capacitance value which is independent of voltage thereacross, means, including switching means, for periodically and separately applying a signal pulse across each of said elements, said pulse being of such polarity as to bias the photodiode of each element forwardly, and means for sensing the current flow through each of said elements.

2. An electrical circuit as defined in claim 1 wherein said photodiode has an inherent capacitance and said capacitance means has a value much greater than said inherent capacitance of said photodiode.

3. An electrical circuit as in claim 1 including a current sensing means for both of said elements, said switching means being effective to form a closed circuit, one at a time only, of each of said elements and said sensing means.

4. An electrical circuit as defined in claim 26 including a plurality of serial combinations of photodiodes and capacitance means arranged in an array of rows and columns, a plurality of row conductors and a plurality of column conductors associated with said array, each of said row conductors being connected to one of said two separate capacitor plates in each capacitance means in a row and each of said column conductors being connected to the other one of said two separate capacitor plates in each capacitance means in a column.

5. An electrical circuit for processing periodic signal pulses comprising a plurality of row conductors, a plurality of column conductors positioned transversely across and insulated from said row of conductors, and a plurality of light sensitive storage elements each connected between a row conductor and a column conductor, each storage element comprising a single photodiode and a capacitance means serially coupled thereto, the capacitance of said capacitance means being larger than the capacitance of said photodiode.

6. An electrical circuit for processing periodic signal pulses comprising a plurality of light sensing storage elements each of which includes a photodiode and a capacitance means serially coupled thereto, said capacitance means having a capacitance value which is independent of voltage thereacross, and means for applying across each of said storage elements a voltage of such polarity as to bias said photodiodes forwardly and of such magnitude as to charge said capacitance means to a predetermined value.

7. An electrical circuit for processing periodic signal pulses comprising a plurality of light sensing storage elements each of which includes a photodiode having a cathode and anode and a voltage-independent capacitance means serially coupled thereto, conductive means interconnecting the cathodes of said photodiodes, a selection circuit coupled to each of said storage elements and adapted to connect each of said storage elements selectively to either of two sources of potential, and output means including a resistor coupled between said conductive means and one of said two sources of potential.

8. An electrical circuit for processing periodic signal pulses comprising a plurality of row conductors, a plurality of column conductors positioned transversely across and insulated from said row conductors, a plurality of light sensitive storage elements connected to said row and column conductors, each storage element comprising a photodiode and a capacitance means serially coupled thereto, the capacitance value of said capacitance means being independent of voltage thereacross, means including said row and column conductors for selectively applying to at least one of said storage elements a signal pulse of such polarity and magnitude as to forward bias the photodiode thereof and to charge the capacitance means thereof, and means for measuring the amount of current required to charge said capacitance means.

9. An electrical circuit as defined in claim 8 wherein the capacitance means in each storage element comprises a pair of capacitors, one coupled between the photodiode of said storage element and one of said row conductors and the other coupled between said photodiode and one of said column conductors.

10. An electrical circuit as defined in claim 8 wherein said signal pulse applying means applies said signal pulse to all the storage elements connected to one row conductor.

11. An electrical circuit as defined in claim 10 wherein each storage element has its photodiode and capacitance means connected serially between one of said row conductors and one of said column conductors.

12. An electrical circuit as defined in claim 11 further comprising means for simultaneously applying to all of said storage elements a voltage pulse of such polarity as to forward bias said photodidoes and for charging all of said capacitance means to the same predetermined level.

13. An electro-optical image translator comprising semiconductive means defining an array of photosensitive rectifying diodes, each diode having an inherent capacitance of a predetermined value, means defining a plurality of capacitors, at least one serially coupled to one electrode of each of said diodes, each of said capacitors having a value independent of voltages and substantially greater than that of the diode serially coupled thereto, first conductive means coupled to the other electrode of each of said diodes, and second conductive means coupled to each of said capacitors.

14. An electro-optical image translator as defined in claim 13 wherein said semiconductive means comprises a body of substantially intrinsic monocrystalline semiconductive material having a pair of opposed major surfaces, an array of regions within said body adjacent to one of said surfaces, said regions having one type conductivity, and a plurality of elongated regions of conductivity type opposite to that of said first mentioned regions in said body adjacent to the other major surface thereof, said first mentioned regions, a portion of said body, and a portion of each of said elongated regions comprising each of said rectifying diodes.

15. An electro-optical image translator as defined in claim 14 wherein said elongated regions comprise said first conductive means.

16. An electro-optical image translator as defined in claim 14 wherein said capacitor defining means comprises a body of insulating material on said one surface of said body, and a plurality of layers of conductive material on said body of insulating material, said conductors having portions overlying said regions of one conductivity type within said body.

17. An electro-optical image sensor as defined in claim 16 wherein said regions of one type conductivity are spaced from each other adjacent to said surface of said body and said insulating body has one predetermined thickness adjacent to said regions and a thickness greater than said predetermined thickness in the spaces between said regions.

18. An electro-optical image translator as defined in claim 13 wherein said semiconductive means comprises a body of monocrystalline semiconductive material having a surface, at least a portion of said body adjacent to said surface being of one type conductivity, a plurality of regions within said portion adjacent to said surface, said regions being of conductivity type opposite to that of said portion, whereby one of said diodes is defined between each of said regions and said portion.

19. An electro-optical image translator as defined in claim 18 wherein said first conductive means comprises at least one highly conductive region within said body portion of the same type conductivity as said portion.

20. An electro-optical image translator as defined in claim 19 wherein said capacitor defining means comprises an electrode in contact with each of said regions of opposite type conductivity, a layer of insulating material disposed on each of said electrodes and a layer of metal on said insulating layer overlying each of said electrodes.

21. An electro-optical image translator as defined in claim 13 wherein said semiconductive means comprises a body of semiconductive material of one type conductivity having a surface, and an array of regions of conductivity type opposite to that of said body in said body adjacent to said surface and defining a plurality of rectifying junctions with the material of said body.

22. An electro-optical image translator as defined in claim 21 wherein said first conductive means comprises an electrode connected to said body of semiconductive material.

23. An electro-optical image translator as defined in claim 22 wherein said capacitor defining means comprises a layer of insulating material on said surface of said body of semiconductive material, a plurality of row conductors on said layer of insulating material, a portion of each of said row conductors overlying one of said regions of opposite type conductivity, a plurality of column conductors on said layer of insulating material, a portion of each of said column conductors overlying one of said regions of opposite type conductivity, and means for insulating said column conductor from said row conductors.

24. An electro-optical image translator as defined in claim 22 wherein said capacitor defining means comprises an electrode in contact with each of said regions of opposite type conductivity, a layer of insulating material on each of said electrodes, and means defining a pair of separate capacitor plates in opposed relation to each of said electrodes.

25. An electro-optical image translator as defined in claim 24 wherein said second conductive means comprises a plurality of row conductors and a plurality of column conductors positioned transversely thereacross, each said capacitor plate defining means including a plate member coupled to said row conductor and a portion of each of said column conductors constituting the other of said plate members.

26. An electrical circuit for processing periodic signal pulses comprising a photodiode having an inherent capacitance, capacitance means comprising a first plate coupled to one electrode of said photodiode and two separate plates in opposed relation to said first plate, the capacitance of said capacitance means being greater than the inherent capacitance of said photodiode, and means for periodically and independently applying a signal pulse to each of said separate capacitor plates of a polarity to forward bias said photodiode.

References Cited

UNITED STATES PATENTS

| | | | |
|---|---|---|---|
| 1,877,279 | 9/1932 | Dawson | 356—215 X |
| 2,136,441 | 11/1938 | Karolus | 178—7.3 |
| 3,378,688 | 4/1968 | Kabell | 250—209 |

OTHER REFERENCES

Astrahan, EL–PC Keyboard, IBM Technical Disclosure Bulletin, vol. 3, No. 3, August 1960, pp. 65–66.

TERRELL W. FEARS, Primary Examiner

U.S. Cl. X.R.

250—209